US012786882B2

(12) United States Patent
Ohara

(10) Patent No.: US 12,786,882 B2
(45) Date of Patent: Nov. 3, 2026

(54) TERMINAL AND COMMUNICATION METHOD

(71) Applicant: NTT DOCOMO, INC., Tokyo (JP)

(72) Inventor: Tomoya Ohara, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 388 days.

(21) Appl. No.: 18/245,470

(22) PCT Filed: Oct. 6, 2020

(86) PCT No.: PCT/JP2020/037922
§ 371 (c)(1),
(2) Date: Mar. 15, 2023

(87) PCT Pub. No.: WO2022/074749
PCT Pub. Date: Apr. 14, 2022

(65) Prior Publication Data

US 2023/0337138 A1 Oct. 19, 2023

(51) Int. Cl.

| | |
|---|---|
| ***H04W 52/02*** | (2009.01) |
| ***H04W 72/1273*** | (2023.01) |
| ***H04W 72/232*** | (2023.01) |
| ***H04W 76/28*** | (2018.01) |

(52) U.S. Cl.
CPC ... *H04W 52/0248* (2013.01); *H04W 72/1273* (2013.01); *H04W 72/232* (2023.01); *H04W 76/28* (2018.02)

(58) Field of Classification Search
CPC ............. H04W 52/0248; H04W 76/28; H04W 72/232; H04W 72/1273
USPC .......................................................... 370/329
See application file for complete search history.

(56) References Cited

U.S. PATENT DOCUMENTS 11,646,847 B2 * 5/2023 Lin ........................ H04L 5/0053 370/329
2022/0312451 A1 * 9/2022 Aiba ..................... H04L 5/0053
2023/0155746 A1 * 5/2023 Ouchi ................. H04W 72/232 370/329

FOREIGN PATENT DOCUMENTS

JP 2023078485 A1 * 7/2023 ........... H04L 1/1854

OTHER PUBLICATIONS

Office Action issued in counterpart Japanese Patent Application No. 2022-555015 mailed on Jul. 9, 2024 (5 pages).
Nokia et al.; "UE power saving enhancements for Active Time Discussion and Decision"; 3GPP TSG RAN WG1 #102-e, R1-2006898; e-Meeting; Aug. 17-28, 2020 (5 pages).
MediaTek Inc.; "Evaluation methodology and enhancements for connected mode UE power saving"; 3GPP TSG RAN WG1 #102-e, R1-2005617; e-Meeting; Aug. 17-28, 2020 (11 pages).
International Search Report issued in PCT/JP2020/037922 on May 18, 2021 (6 pages).

(Continued)

*Primary Examiner* — Asad M Nawaz
*Assistant Examiner* — Hugh Mark Ashley
(74) *Attorney, Agent, or Firm* — Osha Bergman Watanabe & Burton LLP

(57) ABSTRACT

Provided is a terminal having: a receiving unit configured to receive control information including an indication of switching a search space set group, from a base station; and a controlling unit configured to switch the search space set group, based on the indication, wherein the controlling unit does not restart DRX (discontinuous reception) inactivity timer in response to receiving the control information from the base station.

5 Claims, 6 Drawing Sheets

(56) References Cited

OTHER PUBLICATIONS

Written Opinion of the International Searching Authority issued in PCT/JP2020/037922 on May 18, 2021 (3 pages).
3GPP TS 38.300 V16.2.0; "3rd Generation Partnership Project; Technical Specification Group Radio Access Network; NR; NR and NG-RAN Overall Description; Stage 2 (Release 16)"; Jul. 2020 (148 pages).

* cited by examiner

TERMINAL AND COMMUNICATION METHOD

TECHNICAL FIELD

The present invention relates to a terminal and a communication method in a wireless communication system.

BACKGROUND

In NR (New Radio) (also referred to as "5G"), which is a successor system to LTE (Long Term Evolution), technologies are being discussed to satisfy requirements such as high-capacity systems, fast data transmission rates, low latency, simultaneous connection of a plurality of terminals, low cost, and lower power consumption (e.g., Non-patent Reference 1).

In NR release 17, further power saving technology in the connected mode UE for minimizing the impact on system performance is discussed. For example, DCI (Downlink control information)-based power saving operation during DRX (discontinuous reception) active period in active BWP (Bandwidth part), and enhancement of reduction of PDCCH (Physical Downlink Control Channel) monitoring during C (Connected)-DRX are discussed.

RELATED ART

Non-Patent Reference

[Non-Patent Reference 1] 3GPP TS 38.300 V16.2.0 (2020 July)

SUMMARY

Technical Problem

In the conventional configurations related to a search space, switching between search space set groups can be performed. However, a trigger of switching the search space set group is limited, and it is necessary to flexibly switch the search space set group in order to further promote power saving.

The present invention has been made in view of the above points, and its object is to reduce power consumption when monitoring a search space in a wireless communication system.

Solution to Problem

According to the disclosed technology, provided is a terminal comprising: a receiving unit configured to receive control information including an indication of switching a search space set group, from a base station, and a controlling unit configured to switch the search space set group, based on the indication, wherein the controlling unit does not restart DRX (discontinuous reception) inactivity timer in response to receiving the control information from the base station.

Beneficial Effect of the Invention

According to the disclosed technology, power consumption when monitoring a search space in a wireless communication system can be reduced.

DETAILED DESCRIPTION

Embodiments of the present invention are described below with reference to the drawings. It should be noted that the embodiments described below are examples and the embodiments to which the present invention is applied are not limited to the following embodiments.

Conventional technologies are appropriately used in the operation of the wireless communication system according to an embodiment of the present invention. However, the conventional technology is, for example, conventional LTE, but is not limited to the conventional LTE. Further, the term "LTE" used herein should have a broad meaning including LTE-Advanced and techniques after LTE-Advanced (for example, NR) unless otherwise specified.

In addition, in the embodiments of the present invention described below, terms such as SS (Synchronization signal), PSS (Primary SS), SSS (Secondary SS), PBCH (Physical broadcast channel), PRACH (Physical random access channel), PDCCH (Physical Downlink Control Channel), PDSCH (Physical Downlink Shared Channel), PUCCH (Physical Uplink Control Channel), and PUSCH (Physical Uplink Shared Channel) used in the conventional LTE are used. This is for convenience of description, and similar signals, functions and the like may be referred to as other names. Further, the above-mentioned terms in NR correspond to NR-SS, NR-PSS, NR-SSS, NR-PBCH, NR-PRACH and the like. However, a signal used for NR is not necessarily described as "NR-".

Further, in the embodiments of the present invention, a duplex method may be a TDD (Time Division Duplex) method, an FDD (Frequency Division Duplex) method, or any other method (for example, Flexible Duplex method).

Further, in the embodiments of the present invention, "configuring" a wireless parameter and the like may mean "pre-configuring" a predetermined value or configuring a wireless parameter indicated by a base station 10 or a terminal 20.

Figure 1:
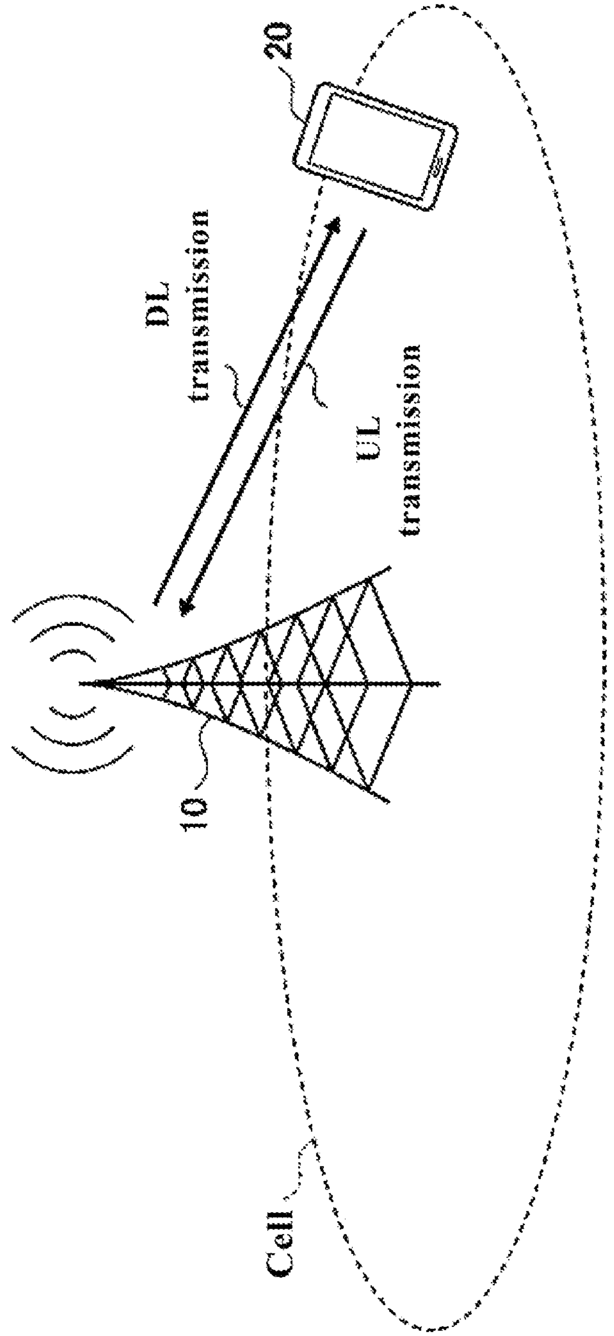
FIG. 1 is a drawing illustrating an example of a configuration of a wireless communication system according to an embodiment of the present invention.

FIG. 1 is a drawing illustrating an example of a configuration of a wireless communication system according to an embodiment of the present invention. The wireless communication system according to an embodiment of the present invention includes a base station 10 and a terminal 20 as shown in FIG. 1. FIG. 1 shows one base station 10 and one terminal 20, but this is just an example and there can be a plurality of base stations 10 and terminals 20.

The base station 10 is a communication device that provides one or more cells and performs wireless communication with the terminal 20. Physical resources of a wireless signal are defined in a time domain and a frequency domain, wherein the time domain may be defined by a number of OFDM (Orthogonal Frequency Division Multiplexing) symbols, and the frequency domain may be defined by a number of subcarriers or a number of resource blocks. The base station 10 transmits a synchronization signal and system information to the terminal 20. The synchronization signal is, for example, NR-PSS and NR-SSS. The system information is transmitted by, for example, NR-PBCH, and is also referred to as communication information. As shown in FIG. 1, the base station 10 transmits control signals or data to the terminal 20 by DL (Downlink) and receives a control signal or data from the terminal 20 by UL (Uplink). Both the base station 10 and the terminal 20 can transmit and receive signals by using beamforming. Further, both the base station 10 and the terminal 20 can apply MIMO (Multiple Input Multiple Output) communication to DL or UL. Further, both the base station 10 and the terminal 20 may communicate via a secondary cell (SCell: Secondary Cell) and a primary cell (PCell: Primary Cell) by using CA (Carrier Aggregation). Further, the terminal 20 may perform communication via a primary cell of the base station 10 and a primary secondary cell group cell (PSCell: Primary Secondary cell group Cell) of another base station 10 by using DC (Dual Connectivity).

The terminal 20 is a communication device having a wireless communication function, such as a smartphone, a mobile phone, a tablet, a wearable terminal, and a communication module for M2M (Machine-to-Machine). As shown in FIG. 1, the terminal 20 receives control signals or data from the base station 10 by DL and transmits control signals or data to the base station 10 by UL, thereby using various types of communication services provided by the wireless communication system.

Here, in NR release 17, further power saving technology in the connected mode UE for minimizing the impact on system performance is discussed. For example, DCI (Downlink control information)-based power saving operation during DRX (discontinuous reception) active period in active BWP (Bandwidth part), and enhancement of reduction of PDCCH (Physical Downlink Control Channel) monitoring during C (Connected)-DRX are discussed.

Figure 2:
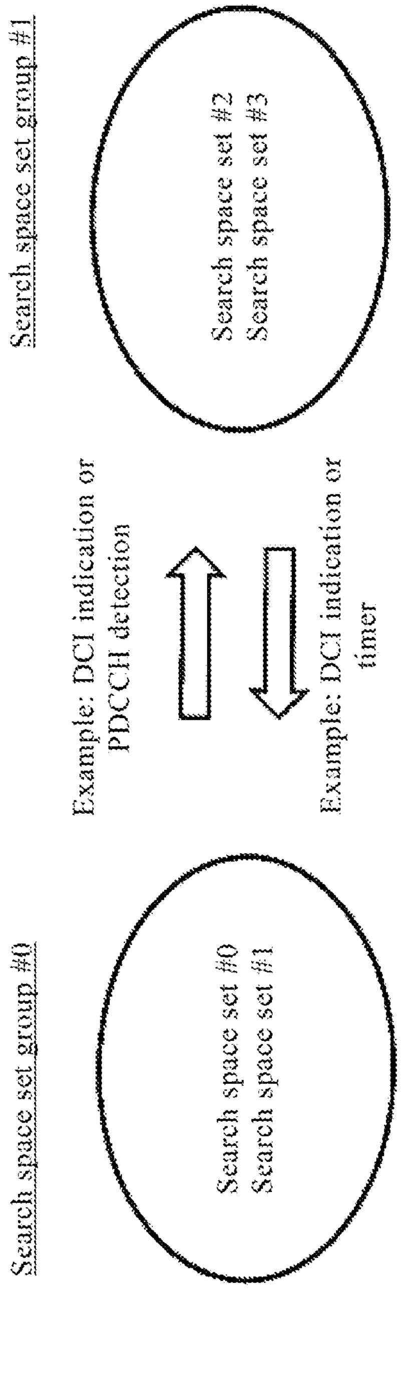
FIG. 2 is a drawing illustrating an example of a search space.

FIG. 2 is a drawing illustrating an example of a search space. A plurality of search space set groups can be configured in a terminal 20 and the search space set group to be used can be switched. The search space set group includes one or more search space sets. The search space set is configurations for monitoring PDCCH, for example, a cycle and a monitoring position.

In the example shown in FIG. 2, the search space set group #0 includes a search space set #0 and a search space set #1, and the search space set group #1 includes a search space set #2 and a search space set #3. A method of switching the search space set to be used is shown in 1)-3) below, for example.

1) Indication according to DCI (Downlink control information) format 2_0 (field "Search space set group switching flag")
2) When the configured timer expires (can be reset by an indication by DCI)
3) Change by detecting PDCCH (for example, when PDCCH is detected, switching from the search space set #0 to the search space set #1)

As shown in FIG. 2, in a case of DCI indication or PDCCH detection, the switching from the search space set #0 to the search space set #1 may be performed, or the switching from the search space set #1 to the search space set #0 may be performed according to DCI indication or timer expiration. In the example shown in FIG. 2, the power consumption of the search space set #0 may be configured to be smaller than that of the search space set #1.

As described above, in the conventional configurations related to a search space, switching between search space set groups can be performed. However, a trigger of switching the search space set group is limited, and it is necessary to flexibly switch the search space set group in order to further promote power saving.

Therefore, the search space set group may be switched by using a DCI field in a DCI format other than the DCI format 2_0. For example, the base station 10 may indicate, to the terminal 20, switching of the search space set group by using DCI format 0_0, DCI format 0_1, DCI format 1_0, DCI format 1_1, DCI format 2_6 and the like.

For example, a "search space set group switching flag" is defined as a DCI field, and by being indicated with 0 or 1, the terminal 20 may perform switching to the corresponding search space set group. The above-described DCI field may be added as a new field to each DCI format, or may be implemented by replacing an existing field.

Note that the DCI format 0_0 may schedule PUSCH. The DCI format 0_1 may schedule a plurality of PUSCHs. The DCI format 1_0 may schedule PDSCH. The DCI format 1_1 may schedule a plurality of PDSCHs. The DCI format 2_6 may indicate information related to power saving control in the outside of the active time of DRX.

Further, switching of the search space set group may be indicated by DCI without accompanying data scheduling of PDSCH, PUSCH, or the like. For example, in a case where one or more fields in DCI are values specified in the specification, the terminal 20 may assume that PDSCH or PUSCH is not scheduled by the DCI. Further, for example, in a case where a bit string at a specific position in DCI is a value specified in the specifications, the terminal 20 may assume that PDSCH or PUSCH is not scheduled by the DCI.

For example, in a case where a value of the frequency domain resource assignment field is a specific value, the terminal 20 may assume that PDSCH or PUSCH is not scheduled by the DCI. Further, for example, in a case where a specific position of a bit string of the frequency domain resource assignment field is a specific value, the terminal 20 may assume that PDSCH or PUSCH is not scheduled by the DCI. The frequency domain resource assignment field may be replaced with another field, or a value of the other field and a value of the frequency domain resource assignment field may be combined to form the specific value.

As described above, in a case where a field has a value specified in the specification, a field used for scheduling PDSCH or PUSCH (or a bit string at the corresponding position) may be replaced, and switching of the search space set group may be indicated.

Note that, in a case where a field is not a value specified in the specification, an indication of switching the search space set group may be performed while performing scheduling of PDSCH or PUSCH.

Figure 3:
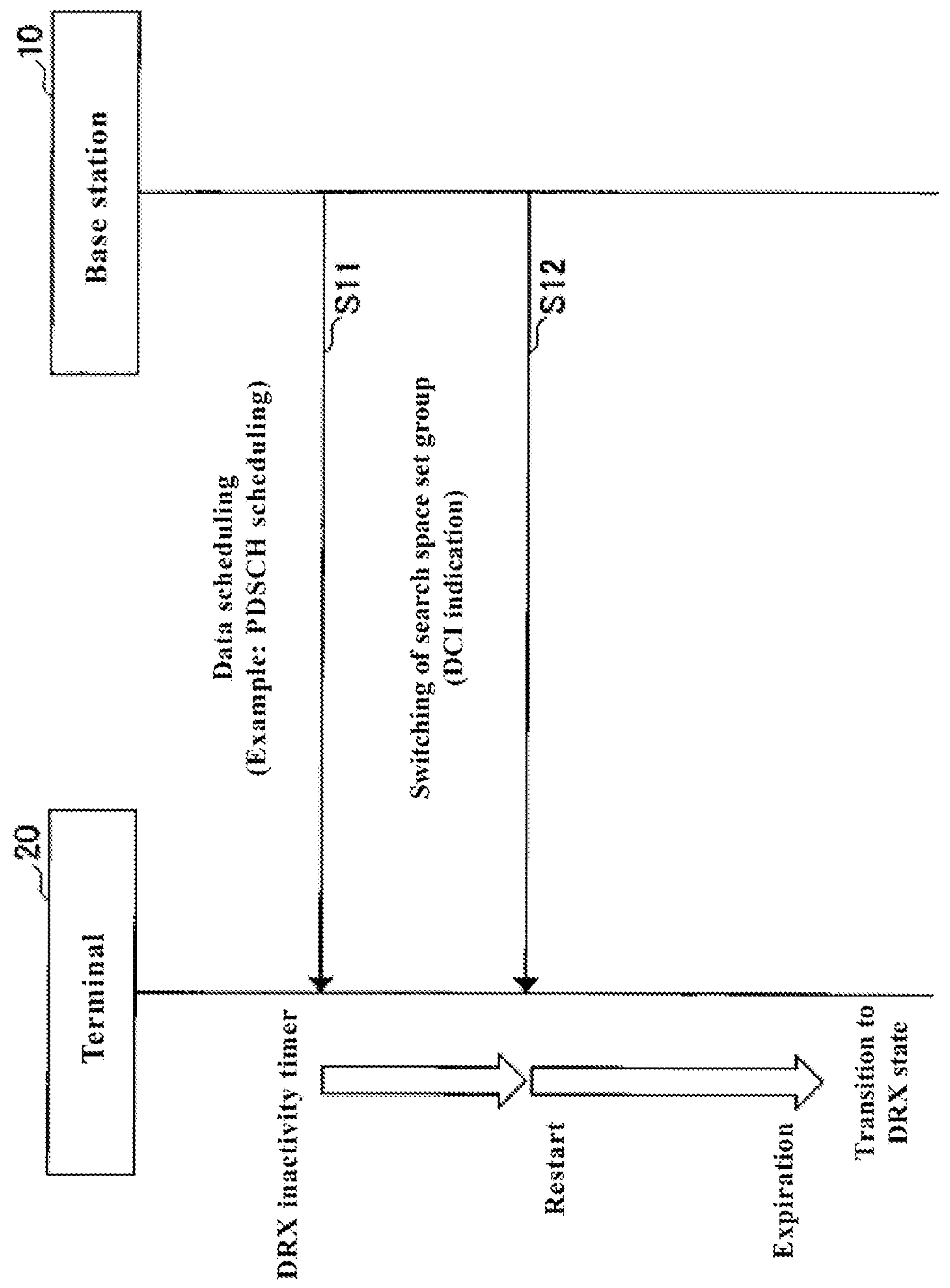
FIG. 3 is a sequence diagram illustrating a configuration example related to a search space.

FIG. 3 is a sequence diagram illustrating a configuration example related to a search space. In step S11 of FIG. 3, a base station 10 transmits data scheduling, for example, PDSCH scheduling, to a terminal 20, and the terminal 20 starts or restarts a DRX inactivity timer. Conventionally, as shown in step S12 of FIG. 3, when the base station 10 indicates, to the terminal 20, switching of the search space set group by DCI, the DRX inactivity timer (drx-Inactivity Timer) in the terminal 20 is reset (re-started), and the time until the DRX inactivity timer expires and transitions to the DRX state becomes longer. For example, in a case where switching to the search space set group having a longer PDCCH monitoring cycle for the purpose of reducing power consumption, is indicated by DCI to the terminal 20 having no data scheduling for a certain period of time, the DCI reception may cause the DRX inactivity timer to be reset, and cause the transition to the DRX state to be delayed, and thus the power consumption reduction effect may be reduced.

Figure 4:
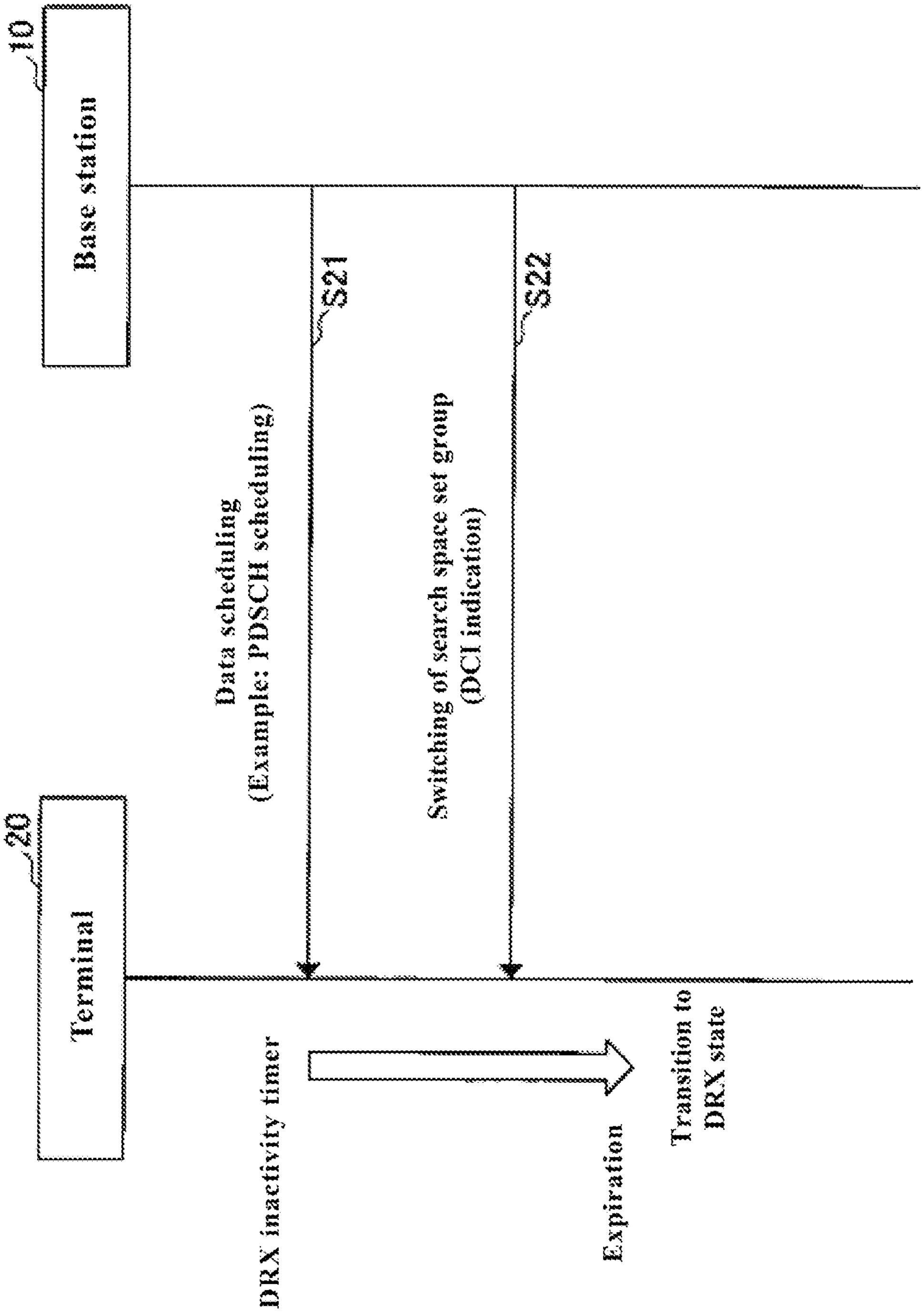
FIG. 4 is a sequence diagram illustrating a configuration example related to a search space according to an embodiment of the present invention.

Therefore, in a case where switching of the search space set group is indicated by DCI, the DRX inactivity timer need not be reset. FIG. 4 is a sequence diagram illustrating a configuration example related to a search space according to an embodiment of the present invention. In step S21 of FIG. 4, a base station 10 transmits data scheduling, for example, PDSCH scheduling, to a terminal 20, and the terminal 20 starts or restarts a DRX inactivity timer. As shown in step S22 of FIG. 4, in a case where switching of the search space set group is indicated by the base station 10 via DCI, the terminal 20 may continue to count the DRX inactivity timer without resetting the DRX inactivity timer.

For example, in a case where an indication indicating switching of the search space set group is included in the DCI field, the terminal 20 is not required to reset the DRX inactivity timer. The DCI field may be or need not be accompanied by data scheduling (PDSCH or PUSCH).

Further, for example, in a case where an indication indicating switching of the search space set group is included in the DCI field and the DCI field is not accompanied by data scheduling, the terminal 20 is not required to reset the DRX inactivity timer.

Further, for example, the base station 10 may indicate, to the terminal 20, whether or not to reset the DRX inactivity timer by the DCI indication indicating switching of the search space set group. For example, the base station 10 may indicate, to the terminal 20, whether or not to reset the DRX inactivity timer by the DCI indication indicating switching of the search space set group via a field in the DCI for each DCI indication.

Further, for example, the base station 10 may indicate, to the terminal 20 in advance, whether or not resetting the DRX inactivity timer is to be indicated by each DCI indication indicating switching of the search space set group, via upper layer signaling (RRC (Radio Resource Control) signaling). For example, the base station 10 may indicate, to the terminal 20, whether or not to reset the DRX inactivity timer as a configuration for each search space set corresponding to the DCI indication indicating switching of the search space set group.

Here, a default search space set group may be indicated or specified for each BWP. The default search space set group is a search space set group that is used when a configuration related to the search space set group is not indicated after BWP switching.

The search space set group that should be the default depends on the characteristics of each BWP (for example, whether the BWP assumes a power saving operation for a case where there is no or little data communication, or the BWP does not assume other power saving operations), and thus, the default search space set group can be configured according to the characteristics of each BWP.

As a configuration related to BWP in the RRC configuration, a default search space set group may be configured for each BWP. Further, a default search space set group may be pre-defined in the specification depending on the type of BWP and the like. For example, in a case where the BWP type is a default BWP, the search space set group #0 may be the default search space set group, and in a case where the BWP type is a BWP other than the default BWP, the search space set group #1 may be the default search space set group.

According to the embodiment above, the terminal 20 can flexibly switch the search space set group as required. Further, the base station 10 can switch the search space set group used by terminal 20 without accompanying data scheduling. Further, the terminal 20 can quickly transition to the DRX state without resetting the DRX inactivity timer when the search space set group is switched. Further, the terminal 20 can use an appropriate search space set group according to the characteristics of BWP before the search space set group is configured. Therefore, the terminal 20 can precisely control the monitoring, suppress unnecessary monitoring, and implement the power saving operation.

That is, power consumption when monitoring a search space in a wireless communication system can be reduced.

(Device Configuration)

Next, an example of a functional configuration of the base station 10 and the terminal 20 that execute processes and operations described so far is described. The base station 10 and the terminal 20 have functions for performing the above embodiments. However, the base station 10 and the terminal 20 each may have only some of the functions in the embodiments.

<Base Station 10>

Figure 5:
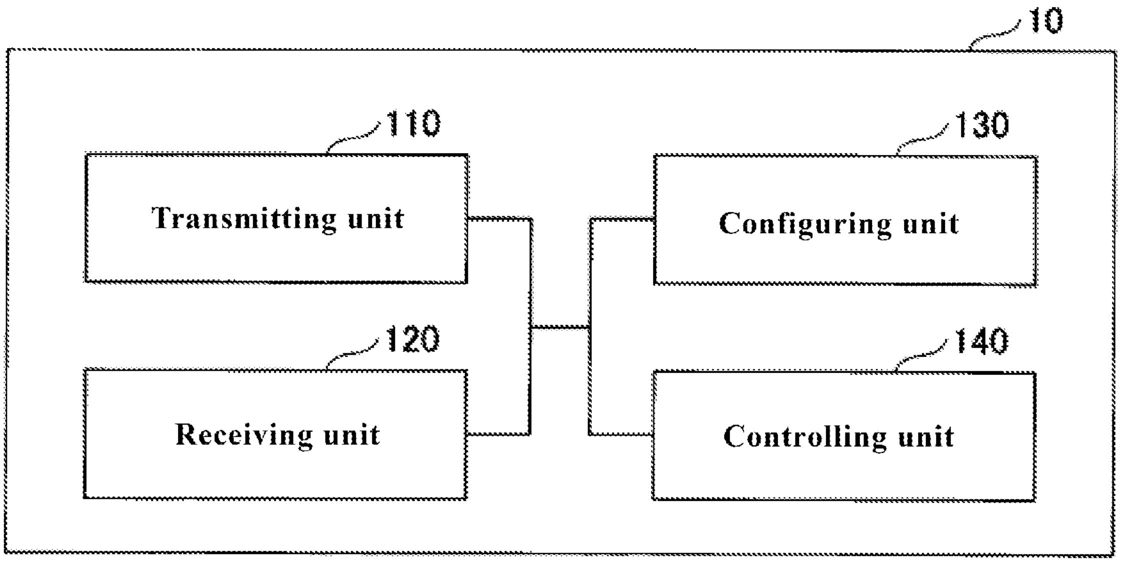
FIG. 5 is a drawing illustrating an example of a functional configuration of a base station 10 according to an embodiment of the present invention.

FIG. 5 is a drawing illustrating an example of a functional configuration of a base station 10 according to an embodiment of the present invention. As shown in FIG. 5, the base station 10 comprises a transmitting unit 110, a receiving unit 120, a configuring unit 130, and a controlling unit 140. The functional configuration shown in FIG. 5 is only an example. Any functional classification and any functional unit name may be used as long as the operations according to the embodiments of the present invention can be performed.

The transmitting unit 110 has a function of generating a signal to be transmitted to the terminal 20 side and transmitting the signal wirelessly. Further, the transmitting unit 110 transmits a message between network nodes to another network node. The receiving unit 120 has a function of receiving various signals transmitted from the terminal 20 and acquiring information of, for example, a higher layer from the received signals. The transmitting unit 110 also has a function of transmitting NR-PSS, NR-SSS, NR-PBCH, DL/UL control signals and the like to the terminal 20. Further, the receiving unit 120 receives a message between network nodes from another network node.

The configuring unit 130 stores pre-configured configuration information and various configuration information to be transmitted to the terminal 20. Content of the configuration information is, for example, a setting related to a search space of the terminal 20.

The controlling unit 140, as described in the embodiments, performs control related to the search space. The functional unit related to signal transmission in the controlling unit 140 may be included in the transmitting unit 110, and the functional unit related to signal reception in the controlling unit 140 may be included in the receiving unit 120.

<Terminal 20>

Figure 6:
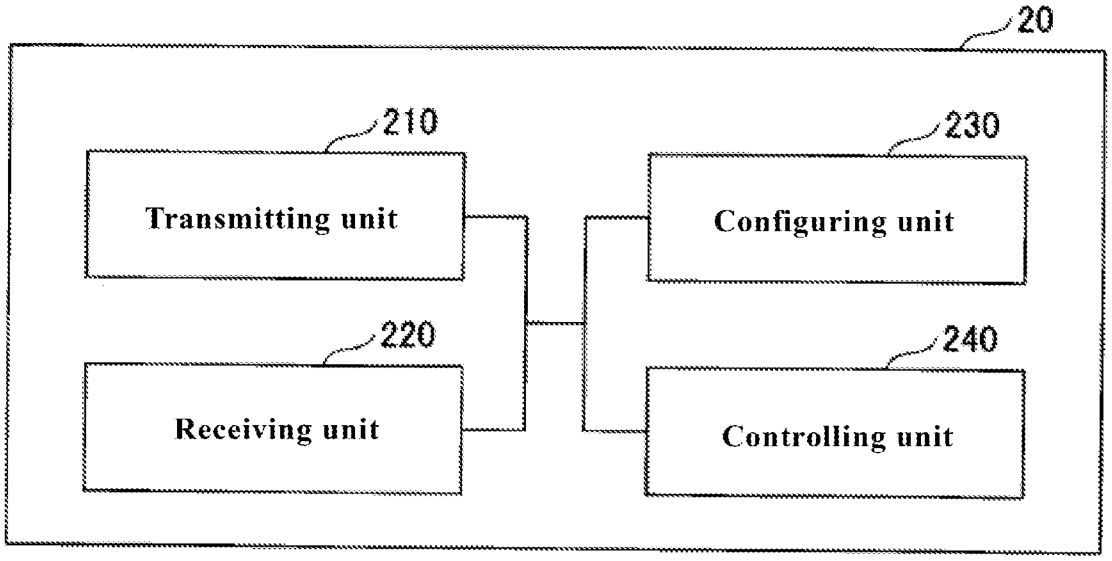
FIG. 6 is a drawing illustrating an example of a functional configuration of a terminal 20 according to an embodiment of the present invention.

FIG. 6 is a drawing illustrating an example of a functional configuration of a terminal 20 according to an embodiment of the present invention. As shown in FIG. 6, the terminal 20 comprises a transmitting unit 210, a receiving unit 220, a configuring unit 230, and a controlling unit 240. The functional configuration shown in FIG. 6 is only an example. Any functional classification and any functional unit name may be used as long as the operations according to the embodiments of the present invention can be performed.

The transmitting unit 210 generates a transmission signal from the transmission data and transmits the transmission signal wirelessly. The receiving unit 220 receives various signals wirelessly and acquires a signal of a higher layer from the received signal of a physical layer. The receiving unit 220 also has a function of receiving NR-PSS, NR-SSS, NR-PBCH, DL/UL/SL control signals and the like transmitted from the base station 10. Further, for example, the transmitting unit 210, as D2D communication, transmits PSCCH (Physical Sidelink Control Channel), PSSCH (Physical Sidelink Shared Channel), PSDCH (Physical Sidelink Discovery Channel), PSBCH (Physical Sidelink Broadcast Channel) and the like to other terminals 20, and the receiving unit 220 receives PSCCH, PSSCH, PSDCH, PSBCH and the like from other terminals 20.

The configuring unit 230 stores various configuration information received from the base station 10 by the receiving unit 220. The configuring unit 230 also stores pre-configured configuration information. Content of the configuration information is, for example, a setting related to a search base of the terminal 20.

The controlling unit 240, as described in the embodiments, performs control related to the search space. The functional unit related to signal transmission in the controlling unit 240 may be included in the transmitting unit 210, and the functional unit related to signal reception in the controlling unit 240 may be included in the receiving unit 220.

(Hardware Configuration)

Block diagrams (FIG. 5 and FIG. 6) used in the description of the embodiments above show blocks of each function unit. These functional blocks (configuration units) are achieved by any combination of at least one of hardware and software. Further, the method of achieving each functional block is not particularly limited. That is, each functional block may be achieved by using one physically or logically coupled device, by directly or indirectly (for example, in a wired or wireless manner) connecting two or more physically or logically separated devices, and by using these multiple devices. The functional block may be achieved by combining software with the one device above or the plurality of devices above.

The functions include, but are not limited to, judging, deciding, determining, computing, calculating, processing, deriving, investing, searching, confirming, receiving, transmitting, outputting, accessing, resolving, choosing, selecting, establishing, comparing, assuming, expecting, treating, broadcasting, notifying, communicating, forwarding, configuring, reconfiguring, allocating, mapping, assigning, etc. For example, a functional block (configuration unit) that makes transmission function is called a transmitting unit or a transmitter. As described above, neither of these methods is specifically limited.

Figure 7:
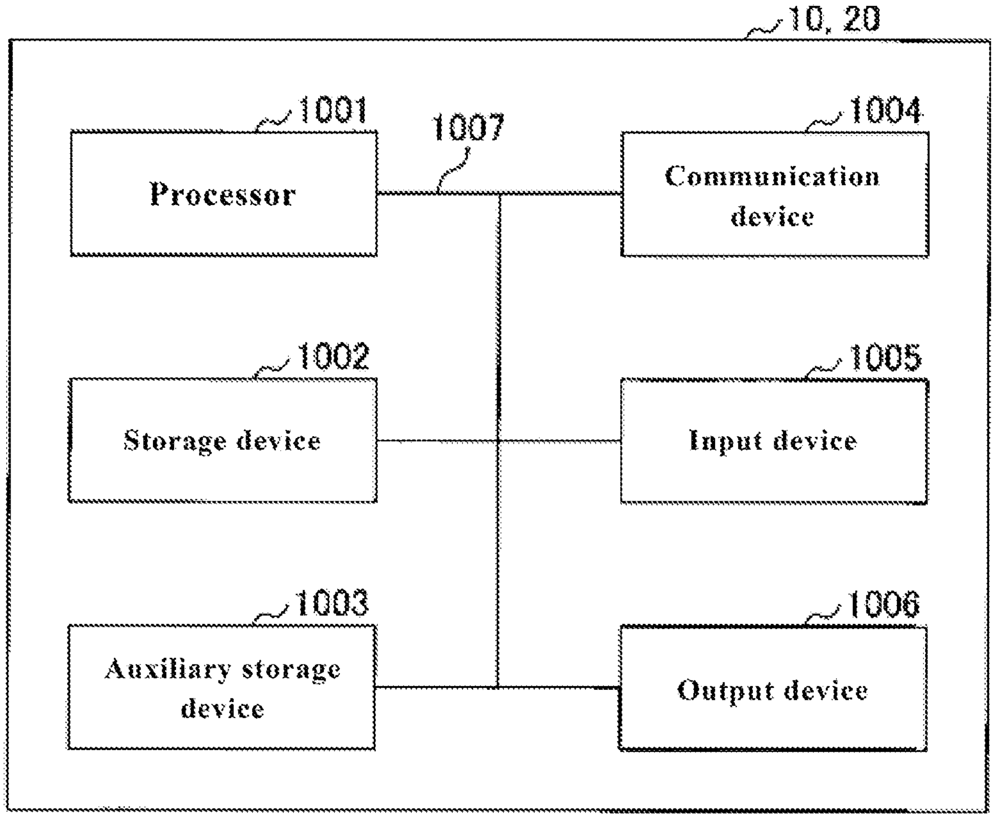
FIG. 7 is a drawing illustrating an example of a hardware configuration of a base station 10 or of a terminal 20 according to an embodiment of the present invention.

For example, the base station 10, the terminal 20 and the like in one embodiment of the present disclosure may function as a computer that processes the wireless communication methods of the present disclosure. FIG. 7 is a drawing illustrating an example of a hardware configuration of the base station 10 and the terminal 20 according to an embodiment of the present disclosure. The base station 10 and the terminal 20 above may be physically configured as a computer device including a processor 1001, a storage device 1002, an auxiliary storage device 1003, a communication device 1004, an input device 1005, an output device 1006, a bus 1007 and the like.

In the following description, the term "device" can be understood as a circuit, a device, a unit and the like. A hardware configuration of the base station 10 and the terminal 20 may be configured to include one or more of the devices shown in the drawings or may be configured to not include some of the devices.

Each function in the base station 10 and the terminal 20 is achieved by the processor 1001 to perform calculation by loading a predetermined software (a program) on hardware such as the processor 1001 and the storage device 1002, by controlling communication by the communication device 1004, and by controlling at least one of reading and writing data on the storage device 1002 and the auxiliary storage device 1003.

The processor 1001, for example, operates an operating system to control the entire computer. The processor 1001 may be configured by a central processing unit (CPU) including an interface with a peripheral equipment, a control device, an arithmetic device, a register and the like. For example, the controlling unit 140, the controlling unit 240 and the like above may be achieved by the processor 1001.

Further, the processor 1001 reads a program (a program code), a software module, data and the like from at least one of the auxiliary storage device 1003 and the communication device 1004 into the storage device 1002, and performs various processes according to the program, the software module and the data. For the program, a program that causes a computer to perform at least some of the operations described in the above embodiments is used. For example, the controlling unit 140 of the base station 10 shown in FIG. 5 may be included in the storage device 1002 and achieved by a control program operated on the processor 1001. Further, for example, the controlling unit 240 of the terminal 20 shown in FIG. 6 may be included in the storage device 1002 and achieved by a control program operated on the processor 1001. Although it has been described that the various processes described above are performed by one processor 1001, these processes may be performed simultaneously or sequentially by two or more processors 1001. The processor 1001 may be implemented by one or more chips. The program may be transmitted from a network via a telecommunication line.

The storage device 1002 is a computer-readable recording medium, and may be configured by at least one of, for example, ROM (Read Only Memory), EPROM (Erasable Programmable ROM), EEPROM (Electrically Erasable Programmable ROM), and RAM (Random Access Memory). The storage device 1002 may be called a register, a cache, a main memory (a main storage device) and the like. The storage device 1002 can store a program (a program code), a software module and the like that can be operated to implement a communication method according to one embodiment of the present disclosure.

The auxiliary storage device 1003 is a computer-readable recording medium, and may be configured by at least one of, for example, an optical disk such as a CD-ROM (Compact Disc ROM), a hard disk drive, a flexible disk, an optical magnetic disk (for example, a compact disk, a digital versatile disk, Blu-ray (registered trademark) disk), a smart card, a flash memory (for example, a card, a stick, a key drive), a floppy (registered trademark) disk, and a magnetic strip. The storage medium described above may be, for example, a database, a server or other suitable mediums including at least one of the storage device 1002 and the auxiliary storage device 1003.

The communication device 1004 is hardware (a transmitting/receiving device) for communicating between computers via at least one of a wired network and a wireless network, and is also referred to as, for example, a network device, a network controller, a network card, and a communication module. The communication device 1004 may be configured to include, for example, a high frequency switch, a duplexer, a filter, and a frequency synthesizer in order to achieve at least one of frequency division duplex (FDD) and time division duplex (TDD). For example, a transmitting/receiving antenna, an amplifier unit, a transmitting/receiving unit, a transmission line interface and the like may be achieved by the communication device 1004. The transmission/receiving unit may be implemented in a physically or logically separated manner between the transmitting unit and the receiving unit.

The input device 1005 is an input device (for example, a keyboard, a mouse, a microphone, a switch, a button, and a sensor) that receives input from outside. The output device 1006 is an output device (for example, a display, a speaker and an LED lamp) that performs output to the outside. The input device 1005 and the output device 1006 may have an integrated configuration (for example, a touch panel).

Further, each device such as the processor 1001 and the storage device 1002 is connected by a bus 1007 for communicating information. The bus 1007 may be configured by using a single bus, or may be configured by using a different bus for each device.

Further, the base station 10 and the terminal 20 may be configured to include hardware such as a microprocessor, a digital signal processor (DSP), an application specific integrated circuit (ASIC), a programmable logic device (PLD), a field programmable gate array (FPGA) and the like, and some or all of the functional blocks may be achieved by the hardware. For example, the processor 1001 may be implemented using at least one of these hardware.

Summary of Embodiments

As described above, according to the embodiments of the present invention, provided is a terminal comprising: a receiving unit configured to receive control information including an indication of switching a search space set group, from a base station; and a controlling unit configured to switch the search space set group, based on the indication, wherein the controlling unit does not restart the DRX (discontinuous reception) inactivity timer in response to receiving the control information from the base station.

According to the configuration above, the terminal 20 can flexibly switch the search space set group as required. Further, the base station 10 can switch the search space set group used by the terminal 20 without accompanying data scheduling. Further, the terminal 20 can quickly transition to the DRX state without resetting the DRX inactivity timer when the search space set group is switched. Therefore, the terminal 20 can precisely control the monitoring, suppress unnecessary monitoring, and implement power saving operation. That is, power consumption when monitoring a search space in a wireless communication system can be reduced.

The controlling unit is not required to restart the DRX inactivity timer in a case where the control information is not accompanied by data scheduling. With this constitution, the terminal 20 can quickly transition to the DRX state without resetting the DRX inactivity timer when the search space set group is switched.

A format of the control information may be capable of data scheduling. With this configuration, the terminal 20 can flexibly switch the search space set group as required.

The control information is not required to actually perform data scheduling. With this configuration, the base station 10 can switch the search space set group used by terminal 20 without accompanying data scheduling.

The controlling unit may use a default search space set group in a BWP (Bandwidth part) in which the search space set group is not configured. With this configuration, the terminal 20 can use an appropriate search space set group according to the characteristics of BWP before the search space set group is configured.

According to the embodiments of the present invention, provided is a communication method performed by a terminal, the communication method includes: receiving control information including an indication of switching a search space set group, from a base station; switching the search space set group, based on the indication; and not restarting a DRX (discontinuous reception) inactivity timer in response to receiving the control information from the base station.

According to the configuration above, the terminal 20 can flexibly switch the search space set group as required. Further, the base station 10 can switch the search space set group used by terminal 20 without accompanying data scheduling. Further, the terminal 20 can quickly transition to the DRX state without resetting the DRX inactivity timer when the search space set group is switched. Therefore, the terminal 20 can precisely control the monitoring, suppress unnecessary monitoring, and implement power saving operation. That is, power consumption when monitoring a search space in a wireless communication system can be reduced.

Supplement to Embodiments

Although the embodiments of the present invention have been described above, the disclosed inventions are not limited to such embodiments, and those skilled in the art will understand various modifications, corrections, alternatives, substitutions and the like. Although explanations have been given using specific numerical examples in order to promote understanding of the present invention, these numerical values are merely examples and any appropriate values may be used unless otherwise specified. Classification of items in the above description is not essential to the present invention, and elements described in two or more items may be used in combination as necessary, and an element described in one item may be applied to another element (as long as there is no contradiction) described in other items. A boundary of the functional unit or the processing unit in the functional block diagram does not necessarily correspond to a boundary of the physical components. Operations of the plurality of functional units may be physically performed by one component, or operations of one functional unit may be physically performed by a plurality of components. For the processing procedure described in the embodiments, the processing order may be changed as long as there is no contradiction. For convenience of description of processing, although the base station 10 and the terminal 20 have been described with reference to functional block diagrams, such devices may be implemented in hardware, software, or a combination thereof. Software operated by a processor of the base station 10 according to the embodiment of the present invention and software operated by a processor of the terminal 20 according to the embodiment of the present invention respectively may be stored in a random access memory (RAM), a flash memory, a read-only memory (ROM), EPROM, EEPROM, a register, a hard disk (HDD), a removable disk, CD-ROM, a database, a server or any other suitable storage medium.

Further, the notification of information is not limited to the aspects/embodiments described in the present disclosure, and may be performed by using other methods. For example, the notification of information may be performed by physical layer signaling (for example, DCI (Downlink Control Information), UCI (Uplink Control Information)), higher layer signaling (for example, RRC (Radio Resource Control) signaling, MAC (Medium Access Control) signaling, notification information (MIB (Master Information Block)), SIB (System Information Block)), other signals or a combination thereof. Further, RRC signaling may be called an RRC message and may be, for example, an RRC connection setup message, and an RRC connection reconfiguration message.

Each aspect/embodiment described in the present disclosure may be applied to at least one of LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), a system using other suitable systems, and a next generation system expanded based on these. Further, a plurality of systems may be applied in a combination (for example, a combination of at least one of LTE and LTE-A and 5G).

The order of processing procedures, sequences, flowcharts, etc. of each aspect/embodiment described in the present specification may be changed as long as there is no contradiction. For example, the methods described in the present disclosure present elements of various steps using exemplary orders, and are not limited to the particular order presented.

The specific operation performed by the base station 10 in the present specification may be performed by its upper node in some cases. In a network consisting of one or more network nodes having the base station 10, it is obvious that various operations performed for communication with the terminal 20 are performed by the base station 10 and at least one of other network nodes (for example, MME, and S-GW, but not limited to these) other than the base station 10. In the above example, a case where there is one network node other than the base station 10 is illustrated, but other network nodes may be a combination of a plurality of the other network nodes (for example, MME and S-GW).

The information, signals, etc. described in the present disclosure may be output from an upper layer (or a lower layer) to a lower layer (or an upper layer). Input/output may be performed via a plurality of network nodes.

The input/output information and the like may be stored in a specific place (for example, a memory) or may be managed using a management table. Information to be input/output may be overwritten, updated or added. The output information and the like may be deleted. The input information and the like may be transmitted to the other device.

Determination in the present disclosure may be performed by a value represented by 1 bit (0 or 1), may be performed by a true/false value (Boolean: true or false), or may be performed by comparison of numerical values (for example, comparison with a predetermined value).

Software, whether called software, firmware, middleware, microcode, hardware description language, or other names, should be broadly interpreted to mean an instruction, an instruction set, a code, a code segment, a program code, a program, a subprogram, a software module, an application, a software application, a software package, a routine, a subroutine, an object, an executable file, an execution thread, a procedure, a feature and the like.

Further, software, an instruction, information and the like may be transmitted and received via a transmission medium. For example, if software uses at least one of wired technology (coaxial cable, optical fiber cable, twisted pair, digital subscriber line (DSL), etc.) and wireless technology (infrared, microwave, etc.) and is transmitted from a website, a server or other remote sources, at least one of these wired and wireless technologies is included within the definition of a transmission medium.

The information, signal, etc. described in the present disclosure may be represented using any of a variety of different technologies. For example, the data, the instruction, the commands, the information, the signal, the bit, the symbol, the chip, etc. may be represented by voltage, current, electromagnetic waves, magnetic field or magnetic particle, light field or photon, or any combination of these.

The terms described in the present disclosure and the terms necessary for understanding the present disclosure may be replaced with terms having the same or similar meanings. For example, at least one of the channel and the symbol may be a signal (signaling). The signal may also be a message. Further, the component carrier (CC) may be called a carrier frequency, a cell, a frequency carrier and the like.

The terms "system" and "network" used in the present disclosure are used interchangeably.

Further, the information, parameters, etc. described in the present disclosure may be represented using an absolute value, may be represented by a relative value from a predetermined value, or may be represented by other corresponding information. For example, a radio resource may be indicated by an index.

The names used for the parameters mentioned above should not be limited in any respect. Further, mathematical formulas and the like using these parameters may differ from those explicitly disclosed in the present disclosure. Since various channels (for example, PUCCH, and PDCCH) and information elements can be identified by any suitable names, various names assigned to these various channels and information elements should not be limited in any respect.

In the present disclosure, the terms "base station (BS)", "wireless base station", "base station device", "fixed station", "NodeB", "eNodeB (eNB)", "gNodeB (gNB)", "access point", "transmission point", "reception point", "transmission/reception point", "cell", "sector", "cell group", "carrier", "component carrier", etc. may be used interchangeably. The base station may be called by terms such as macrocell, small cell, femtocell and picocell.

The base station can accommodate one or more (for example, three) cells. When the base station accommodates a plurality of cells, the entire base station coverage area can be divided into a plurality of smaller areas, and each of the smaller areas can provide communication service by a base station subsystem (for example, a small indoor base station (RRH: Remote Radio Head)). The term "cell" or "sector" refers to a part or the whole of at least one of the coverage area of the base station and the base station subsystem that provides communication service in this coverage.

In the present disclosure, the terms "mobile station (MS)", "user terminal", "user equipment (UE)", "terminal", etc. may be used interchangeably.

The mobile station may be called by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

At least one of the base station and the mobile station may be called a transmission device, a reception device, a communication device and the like. At least one of the base station and the mobile station may be a device mounted on a movable body, a movable body itself and the like. The movable body may be a vehicle (for example, a car, and an airplane), may be an unmanned movable body (for example, a drone, and a self-driving car), or may be a robot (manned or unmanned). It should be noted that at least one of the base station and the mobile station includes a device that does not necessarily move during communication operation. For example, at least one of the base station and the mobile station may be IoT (Internet of Things) equipment such as a sensor.

Further, the base station in the present disclosure may be replaced by a user terminal. For example, each aspect/embodiment of the present disclosure may be applied to a configuration replaced by communication between a plurality of terminals 20 (for example, called D2D (Device-to-Device), and V2X (Vehicle-to-Everything)) for communication between the base station and the user terminal. In this case, the terminal 20 may have the function of the base station 10 described above. In addition, terms such as "upstream" and "downstream" may be replaced by terms corresponding to communication between terminals (for example, "side"). For example, an upstream channel, a downstream channel and the like may be replaced by a side channel.

Similarly, the user terminal in the present disclosure may be replaced by a base station. In this case, the base station may have the function of the user terminal described above.

A term "determining" used in the present disclosure may include a wide variety of operations. "Determining" may include "determining" judging, calculating, computing, processing, deriving, investigating, looking up, search, inquiry (for example, searching in a table, a database or another data structure) and ascertaining. "Determining" may include "determining" receiving (for example, receiving information), transmitting (for example, transmitting information), input, output and accessing (for example, accessing data in a memory). Further, "determining" may include "determining" resolving, selecting, choosing, establishing, comparing, etc. That is, "determining" may include "determining" a certain operation. Further, "determining" may be replaced by "assuming", "expecting", "considering" and the like.

Terms "connected" and "coupled" or any variation thereof refer to any direct or indirect connection or coupling between two or more elements and may include the presence of one or more intermediate elements between the two elements "connected" or "coupled" to each other. Connection or coupling between the elements may be physical, logical, or a combination thereof. For example, "connection" may be replaced by "access". As used in the present disclosure, the two elements use at least one of one or more wires, cables and printed electrical connections and are considered to be "connected" or "coupled" to each other using electromagnetic energy having wavelengths in a radio frequency domain, a microwave domain and a light (both visible and invisible) domain as some non-limiting and non-comprehensive examples.

The reference signal may be abbreviated as RS and may be called a pilot according to the applied standard.

"Based on" as used in the present disclosure does not mean "based only on" unless otherwise stated. In other words, the phrase "based on" means both "based only on" and "based at least on".

Any reference to the elements using designations such as "first", "second" and so on as used in the present disclosure does not generally limit the quantity or order of those elements. These designations may be used in the present disclosure as a convenient method to distinguish between two or more elements. Therefore, references to the first and second elements do not mean that only two elements can be adopted, or that the first element must somehow precede the second element.

The "means" in the configuration of each of the above devices may be replaced by a "part", a "circuit", a "device" and the like.

When "include", "including" and variations thereof are used in the present disclosure, these terms are intended to be inclusive as a term "comprising". Further, the term "or" used in the present disclosure is intended not to be exclusive.

A radio frame may be configured by one or more frames in a time domain. Each frame of the one or more frames in the time domain may be called a subframe. The subframe may further be configured by one or more slots in the time domain. The subframe may be a fixed time length (for example, 1 ms) that does not depend on numerology.

The numerology may be a communication parameter that applies to at least one of transmission and reception of a signal or a channel. The numerology may indicate at least one of, for example, a subcarrier spacing (SCS), a bandwidth, a symbol length, a cyclic prefix length, a transmission time interval (TTI), a number of symbols per TTI, a wireless frame configuration, a specific windowing process performed by a transmitter/receiver to perform in a frequency domain, and a specific windowing process for the transmitter/receiver to perform in a time domain.

The slot may be configured by one or more symbols (OFDM (Orthogonal Frequency Division Multiplexing) symbol, and SC-FDMA (Single Carrier Frequency Division Multiple Access) symbol, etc.) in the time domain. The slot may be in time units based on numerology.

The slot may include a plurality of mini slots. Each mini slot may be configured by one or more symbols in the time domain. Further, the mini slot may be called a sub slot. The mini slot may be configured by a smaller number of symbols than the slots. PDSCH (or PUSCH) transmitted in the time unit larger than the mini slot may be called PDSCH (or PUSCH) mapping type A. PDSCH (or PUSCH) transmitted using the mini slot may be called PDSCH (or PUSCH) mapping type B.

The radio frame, the subframe, the slot, the mini slot and the symbol all represent in the time unit for transmitting a signal. For the radio frame, the subframe, the slot, the mini slot and the symbol, correspondingly different names may be used.

For example, one subframe may be called a transmission time interval (TTI), a plurality of consecutive subframes may be called TTI, and one slot or one mini slot may be called TTI. That is, at least one of the subframe and TTI may be a subframe (1 ms) in existing LTE, may be a period shorter than 1 ms (for example, 1-13 symbols), or may be a period longer than 1 ms. The unit representing TTI may be called a slot, a mini slot and the like instead of the subframe.

Here, TTI refers to, for example, the minimum time unit of scheduling in wireless communication. For example, in the LTE system, the base station schedules each terminal 20 to allocate a wireless resource (a frequency bandwidth that can be used in each terminal 20, transmission power, etc.) in a TTI unit. The definition of TTI is not limited to this.

TTI may be a transmission time unit such as a channel-encoded data packet (transport block), a code block, a code word and the like, and may be a processing unit such as scheduling, link adaptation and the like. When TTI is given, the time interval (for example, a number of symbols) to which the transport block, the code block, the code word, etc. is actually mapped may be shorter than the corresponding TTI.

When one slot or one mini slot is called TTI, one or more TTI (that is, one or more slots or one or more mini slots) may be the minimum time unit for scheduling. Further, a number of slots (a number of mini slots) configuring the minimum time unit of the corresponding scheduling may be controlled.

TTI having a time length of 1 ms may be called a usual TTI (TTI in LTE, Rel. 8-12), a normal TTI, a long TTI, a usual subframe, a normal subframe, a long subframe, a slot and the like. A TTI shorter than the normal TTI may be called a shortened TTI, a short TTI, a partial TTI (a partial or fractional TTI), a shortened subframe, a short subframe, a mini slot, a subslot, a slot and the like.

The long TTI (for example, a usual TTI and a subframe) may be replaced by a TTI having a time length of more than 1 ms, and the short TTI (for example, a shortened TTI) may be replaced by a TTI having a TTI length less than the TTI length of the long TTI and of 1 ms or more.

The resource block (RB) is a resource allocation unit in the time domain and the frequency domain and may include one or more continuous subcarriers in the frequency domain. A number of subcarriers included in RB may be the same regardless of numerology, for example, it may be 12. A number of subcarriers included in RB may be determined based on numerology.

The time domain of RB may also include one or more symbols and may be a length of one slot, one mini slot, one subframe, or one TTI. Each of one TTI, one subframe, etc. may be configured by one or more resource blocks.

One or more RBs may be called a physical resource block (PRB: Physical RB), a sub-carrier group (SCG), a resource element group (REG), a PRB pair, an RB pair and the like.

Further, the resource block may be configured by one or more resource elements (REs). For example, one RE may be a wireless resource domain of one subcarrier and one symbol.

A bandwidth part (BWP) (which may also be called a partial bandwidth) may represent a subset of consecutive common RB (common resource blocks) for a certain neurology in a certain carrier. Here, the common RB may be specified by an index of RB with respect to a common reference point of the carrier. PRB may be defined in a certain BWP and may be numbered within the corresponding BWP.

The BWPs may include a BWP for UL (UL BWP) and a BWP for DL (DL BWP). One or more BWPs may be set in one carrier for UE.

At least one of the set BWP may be active and UE may not be assumed to transmit/receive a predetermined signal/channel outside the active BWP. Further, the "cell", "carrier", etc. in the present disclosure may be replaced by "BWP".

The configurations of the radio frame, the subframe, the slot, the mini slot, the symbol and the like described above are merely examples. For example, configurations such as a number of subframes included in the radio frame, a number of slots per subframe or radio frame, a number of mini slots included in the slot, a number of symbols and RBs included in the slot or the mini slot, a number of subcarriers included in RB, a number of symbols in TTI, the symbol length, the cyclic prefix (CP) length can be changed in various ways.

In the present disclosure, if an article is added by translation, for example, a, an and the in English, the present disclosure may include plural nouns following these articles.

In the present disclosure, a term "A and B are different" may mean "A and B are different from each other". The term may also mean "A and B are different from C". Terms such as "separate", "combine" and the like may be interpreted in the same way as "be different".

Each aspect/embodiment described in the present disclosure may be used alone, may be used in combination, or may be used by switching according to performance. Further, a notification of predetermined information (for example, a notification of "being X") is not limited to an explicit one, and may be performed implicitly (for example, the notification of the predetermined information is not performed).

According to the present disclosure, DCI is an example of control information.

Although the present disclosure has been described in detail above, it is clear to those skilled in the art that the present disclosure is not limited to the embodiments described in the present disclosure. The present disclosure may be implemented as amendment and modification aspects without departing from the spirit and scope of the present disclosure, which are determined by the description of the scope of claims. Therefore, description of the present disclosure is for purposes of illustration and does not have any limiting meaning to the present disclosure.

EXPLANATION OF REFERENCE NUMERALS

10 Base station
110 Transmitting unit
120 Receiving unit
130 Configuring unit
140 Controlling unit
20 Terminal
210 Transmitting unit
220 Receiving unit
230 Configuring unit
240 Controlling unit
1001 Processor
1002 Storage device
1003 Auxiliary storage device
1004 Communication device
1005 Input device
1006 Output device

The invention claimed is:

1. A terminal comprising:

a receiver configured to receive downlink control information that includes information indicating a search space set group, in a format that can schedule an uplink data channel or a downlink data channel from a base station;

a memory that stores operational instructions; and a processor configured to perform switching to the search space set group indicated by the downlink control information, based on the operational instructions stored in the memory, wherein the processor switches the search space set group to a default search space set group that is indexed 0 and that is configured for each bandwidth part after switching of the each bandwidth part, and wherein power consumption of the default search space set group that is indexed 0 is different from power consumption of the search space set group indicated by the downlink control information.

2. A base station comprising:

a memory that stores operational instructions;

a processor configured to configure downlink control information that includes information indicating a search space set group, in a format that can schedule an uplink data channel or a downlink data channel, based on the operational instructions stored in the memory; and a transmitter configured to transmit the downlink control information to a terminal, wherein the processor configures the terminal to switch the search space set group to a default search space set group that is indexed 0 and that is configured for each bandwidth part after switching of the each bandwidth part, and wherein power consumption of the default search space set group that is indexed 0 is different from power consumption of the search space set group indicated by the downlink control information.

3. A communication system comprising: a base station; and a terminal, wherein the base station includes:

a processor configured to configure downlink control information that includes information indicating a search space set group, in a format that can schedule an uplink data channel or a downlink data channel; and a transmitter configured to transmit the downlink control information to the terminal, and the terminal includes:

a receiver configured to receive the downlink control information from the base station;

a memory that stores operational instructions; and a processor configured to perform switching to the search space set group indicated by the downlink control information, based on the operational instructions stored in the memory, wherein the processor of the terminal switches the search space set group to a default search space set group that is indexed 0 and that is configured for each bandwidth part after switching of the each bandwidth part, and wherein power consumption of the default search space set group that is indexed 0 is different from power consumption of the search space set group indicated by the downlink control information.

4. A communication method performed by a terminal, the communication method comprising:

receiving downlink control information that includes information indicating a search space set group, in a format that can schedule an uplink data channel or a downlink data channel from a base station;

storing operational instructions in a memory;

performing switching to the search space set group indicated by the downlink control information, based on the operational instructions stored in the memory; and switching the search space set group to a default search space set group that is indexed 0 and that is configured for each bandwidth part after switching of the each bandwidth part, wherein power consumption of the default search space set group that is indexed 0 is different from power consumption of the search space set group indicated by the downlink control information.

5. The terminal according to claim 1, wherein the default search space set group that is indexed 0 is a search space set group that is used when a configuration related to the search space set group is not indicated to the terminal after switching.

* * * * *